Figure 1:
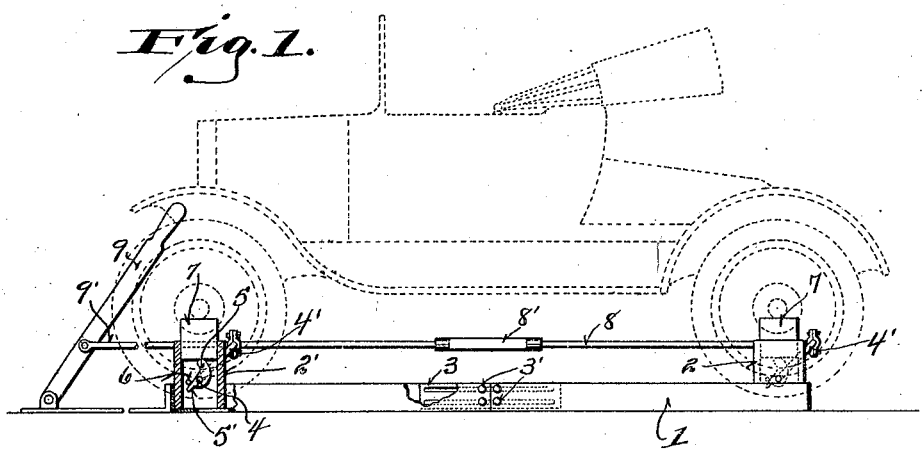

A. L. TRUDEAU AND L. J. LENSMEYER.
AUTOMOBILE JACK.
APPLICATION FILED FEB. 28, 1921.

1,402,690.

Patented Jan. 3, 1922.

Inventors!
Abraham L. Trudeau
Louis J. Lensmeyer

Witness:
Robert E. Weber

UNITED STATES PATENT OFFICE.

ABRAHAM L. TRUDEAU, OF TWO RIVERS, AND LOUIS J. LENSMEYER, OF MANITOWOC, WISCONSIN.

AUTOMOBILE JACK.

1,402,690.  Specification of Letters Patent.  Patented Jan. 3, 1922.

Application filed February 28, 1921. Serial No. 448,669.

*To all whom it may concern:*

Be it known that ABRAHAM L. TRUDEAU and LOUIS J. LENSMEYER, both citizens of the United States, and residents of Two Rivers and Manitowoc, in the county of Manitowoc and State of Wisconsin, respectively, have invented certain new and useful Improvements in Automobile Jacks; and we do hereby declare that the following is a full, clear, and exact description thereof.

Our invention has for its object to provide a simple, economical and effective four wheel jack mechanism for vehicles or the like, the invention being particularly applicable for installation in garages or storage quarters, whereby the vehicle, when run over the jack mechanism, can be lifted to relieve strain upon the pneumatic tires.

With the above objects in view, the invention consists in certain peculiarities of construction and combination of parts, as are hereinafter set forth with reference to the accompanying drawings and subsequently claimed.

Figure 2:
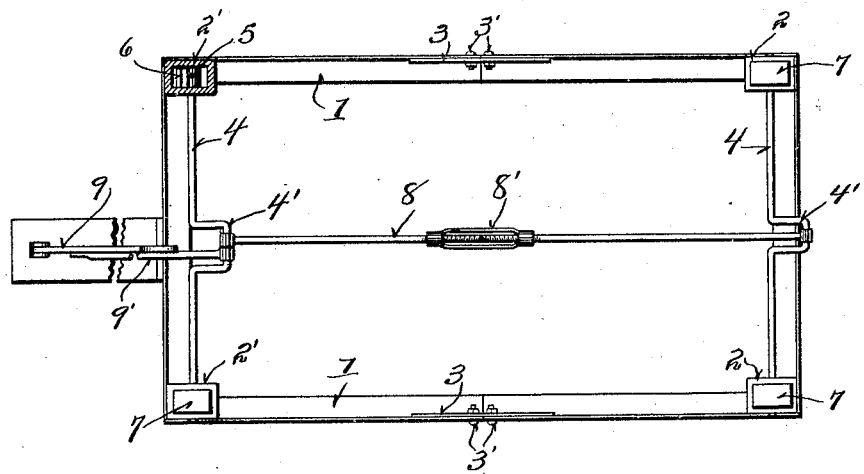

In the drawings:

Figure 1 represents a side elevation, with parts broken away and in section, of a jack mechanism embodying the features of our invention, a vehicle being shown in correct position for its support, and Figure 2 is a plan view of the jack mechanism with one of the hollow posts in section to more particularly illustrate certain cam mechanism associated therewith.

Referring by characters to the drawings 1—1 represent side angle iron sills of a rectangular frame, and fitted to the corners thereof are rectangular hollow companion pairs of posts 2—2, 2'—2'. As shown in the side sills 1 are formed in separable sections connected by longitudinally slotted fish plates 3, the same being adapted to receive tie bolts 3', which bolts can be loosened whereby the frame can be longitudinally adjusted to vary its length, so as to center the companion pairs of hollow posts directly under the axles of vehicles of different lengths. Each companion pair of hollow posts have journalled therein the ends of transversely disposed lifting rods 4, the central portions of each being bent to form a crank 4'. The ends of the rods have secured thereto companion pairs of eccentrics of cams 5 having tail pieces 5', which are adapted to engage stop pins 6 when the lifting rods are swung in their active position, the stop pins serving also to limit movement of the rods in their normal positions of rest, by the heads of the cams coming in contact with said stops. Respectively mounted within the hollow posts above the cams are plunger blocks 7, the lower faces of which are arranged to be engaged by the cams.

The rod cranks 4' are each connected by a tie rod 8, the outer ends of which are wristed to the crank portions of the rods, and said tie rod is separated intermediately, having threaded ends for engagement with a turn buckle 8', whereby the tie rod may be varied as to length to compensate for the longitudinal adjustment of the frame. An actuating lever 9 is pivotally mounted in advance of one end of the rectangular frame, the lever being connected by a link 9' through the crank of the juxtaposed lifting rod, as best shown in Figure 2.

Obviously, while we have shown the actuating lever arranged at one end of the jack mechanism, the same can be positioned transversely of the vehicle, whereby the operator can stand to one side of the vehicle when lifting it.

The high point of each cam is positioned at approximately an angle of 45 degrees, with relation to its associated rod crank, whereby the crank can be swung across the vertical line of load strain through 90 degrees. Hence, as shown in Figure 1, when the vehicle is in position to be lifted, the lever 9 is swung to the position indicated, whereby the high point of the cranks will cause the plunger blocks to simultaneously lift the vehicle at four points, and the load strain being aligned and intersecting the axes of the rod, in each instance, there will be no tendency for said load to force the blocks downward.

It follows that when it is desired to drop the vehicle from its suspended position, the lever is swung in the opposite direction from that shown, and as the cams move from right to left, owing to their eccentric face, the weight of the vehicle can slowly be permitted to settle, whereby the tires will come in contact with the ground surfaces.

This simple arrangement of cams and associated crank rods will materially reduce the cost of manufacture, and it also eliminates expensive gear arrangements or the like. Furthermore, the jack mechanism can all be constructed from standard parts, with the exception of the cams, which may be cheaply manufactured by casting.

It is understood that we may vary certain structural features of the invention within the scope of the claims.

We claim:

1. A four wheel jack mechanism for vehicles comprising a rectangular frame having hollow companion pairs of corner posts extending therefrom, plunger blocks mounted in the posts, a pair of cranked oscillatory rods, each having its ends journalled in a pair of the hollow posts under the plunger, a pair of cams secured to the rods engageable with the underfaces of the plunger blocks, stops for limiting movement of the oscillatory rods, a tie rod in wristed connection with the crank portions of each rod, an actuating lever and a link connecting the actuating lever and one of the tie rod cranks.

2. A four wheel jack mechanism for vehicles comprising a rectangular frame, means for varying the length of the frame, a hollow companion pair of posts carried by the frame, plunger blocks mounted in the posts, a pair of cranked oscillatory rods each having its ends journaled in a pair of the hollow posts under the plunger, a pair of cams secured to each rod engageable with the underfaces of the blocks, stops carried by the posts for limiting movement of the cam in both directions, a tie rod in wristed connection with the cranked portions of the rods, means for varying the length of the tie rod, an actuating lever, and a link connecting the actuating lever, and the cranked portion of one of the rods.

In testimony that we claim the foregoing we have hereunto set our hands at Two Rivers, in the county of Manitowoc and State of Wisconsin.

ABRAHAM L. TRUDEAU.
LOUIS J. LENSMEYER.